(12) United States Patent
Hultqvist et al.

(10) Patent No.: US 11,770,545 B2
(45) Date of Patent: Sep. 26, 2023

(54) METHOD FOR PROVIDING PRUNABLE VIDEO

(71) Applicant: Axis AB, Lund (SE)

(72) Inventors: Sebastian Hultqvist, Lund (SE); Viktor Edpalm, Lund (SE); Axel Keskikangas, Lund (SE); Anton Eliasson, Lund (SE)

(73) Assignee: Axis AB, Lund (SE)

( * ) Notice: Subject to any disclaimer, the term of this patent is extended or adjusted under 35 U.S.C. 154(b) by 241 days.

(21) Appl. No.: 17/398,665

(22) Filed: Aug. 10, 2021

(65) Prior Publication Data

US 2022/0086468 A1 Mar. 17, 2022

(30) Foreign Application Priority Data

Sep. 11, 2020 (EP) .................................... 20195760

(51) Int. Cl.
*H04N 19/30* (2014.01)
*H04N 23/80* (2023.01)
(Continued)

(52) U.S. Cl.
CPC ............. *H04N 19/30* (2014.11); *G06F 16/71* (2019.01); *G06F 21/64* (2013.01); *H04N 5/91* (2013.01);
(Continued)

(58) Field of Classification Search
CPC ........ H04N 19/30; H04N 5/91; H04N 19/119; H04N 19/137; H04N 19/142; H04N 23/80; H04N 7/188; H04N 19/107; H04N 19/132; H04N 19/134; H04N 19/136; H04N 19/174; H04N 19/88; H04N 21/23418;
(Continued)

(56) References Cited

U.S. PATENT DOCUMENTS 6,404,814 B1 * 6/2002 Apostolopoulos ..... H04N 19/40
375/E7.076
7,760,230 B2 7/2010 Russell et al.
(Continued)

FOREIGN PATENT DOCUMENTS

EP 2826530 A2 1/2015
WO 2015/199991 A2 12/2015
(Continued)

OTHER PUBLICATIONS

Extended European Search Report dated May 17, 2021 for European Patent Application No. 20195760.2.
(Continued)

*Primary Examiner* — Hung H Lam
(74) *Attorney, Agent, or Firm* — Volpe Koenig

(57) ABSTRACT

A method of encoding a video stream for the provision of prunable video data, comprising: receiving, in an encoder, a video stream in which each image frame of the video stream is divided into a number of subviews, providing each subview with an assigned category based on a content of the particular subview, monitoring the evolution of category assigned for each subview, and encoding the video stream using a hierarchical P-frame encoding structure, in such manner that each change in category for a subview starts a new hierarchical P-frame structure.

15 Claims, 5 Drawing Sheets

(51) Int. Cl.
*H04N 19/119* (2014.01)
*H04N 19/137* (2014.01)
*H04N 19/142* (2014.01)
*G06F 16/71* (2019.01)
*G06F 21/64* (2013.01)
*H04N 5/91* (2006.01)

(52) U.S. Cl.
CPC ......... *H04N 19/119* (2014.11); *H04N 19/137* (2014.11); *H04N 19/142* (2014.11); *H04N 23/80* (2023.01)

(58) Field of Classification Search
CPC ............ H04N 21/2353; H04N 21/8455; G06F 16/71; G06F 21/64
See application file for complete search history.

(56) References Cited

U.S. PATENT DOCUMENTS

| | | | |
|---|---|---|---|
| 9,591,318 B2* | 3/2017 | Lu | H04N 19/39 |
| 9,612,964 B2* | 4/2017 | Islam | G06F 3/0685 |
| 10,134,145 B2 | 11/2018 | Wang et al. | |
| 2003/0095598 A1* | 5/2003 | Lee | H04N 19/20 |
| | | | 375/E7.145 |
| 2011/0170615 A1 | 7/2011 | Vo et al. | |
| 2011/0188746 A1* | 8/2011 | Getsch | G06T 7/90 |
| | | | 382/165 |
| 2012/0288015 A1 | 11/2012 | Zhang et al. | |
| 2013/0034153 A1* | 2/2013 | Song | H04N 19/615 |
| | | | 375/240.03 |
| 2013/0073297 A1* | 3/2013 | Yu | H04N 19/132 |
| | | | 704/500 |
| 2013/0170564 A1 | 7/2013 | Zhang et al. | |
| 2015/0131715 A1 | 5/2015 | Ozawa | |
| 2018/0242024 A1 | 8/2018 | Chen et al. | |
| 2019/0122064 A1* | 4/2019 | Ishikawa | H04N 23/80 |

FOREIGN PATENT DOCUMENTS

| | | |
|---|---|---|
| WO | 2015/199991 A3 | 2/2016 |
| WO | 2019/243534 A1 | 12/2019 |

OTHER PUBLICATIONS

Partial European Search Report dated Feb. 12, 2021 for European Patent Application No. 20195760.2.

* cited by examiner

METHOD FOR PROVIDING PRUNABLE VIDEO

FIELD OF INVENTION

The present invention relates to a method for providing prunable video.

TECHNICAL BACKGROUND

The use of video surveillance is steadily increasing, and with it comes issues related to storage of video data. Video data of decent quality consumes storage space, both locally in a surveillance camera as well as in centralized storage (such as cloud storage), and storage space is always associated with a cost. Video data often needs to be stored until: 1) it has been reviewed and deemed unimportant; or 2) the time period during which it could have been relevant has passed. For some installations the time period in question may be set by legislation. The general rule often applied is to store the video data as long as possible, and once there is no more storage space available some kind of pruning scheme is applied.

Pruning refers to the process of removing video frames or video sequences from a video file with the purpose of reducing a file size, and in some technical descriptions it is referred to as "thinning". The pruning scheme may typically be a straightforward FIFO (first-in-first-out) approach, where the oldest video data is deleted. This scheme may be refined by adding a level of importance to some video sequences, such that they are kept longer. Other pruning schemes may also involve decreasing the quality of the video data in order for it to be less space-consuming while still allowing for parts of each stored video sequence to be kept (as long as possible), although this is an approach that requires processing power. In this version, the planned deterioration in quality may be based on the age of the video date, as disclosed in U.S. Pat. No. 6,813,312 by the present applicant. Examples of this include pruning P-frames in a regular video stream comprising I-frames and P-frames. Any of these may involve also taking the video content into account, e.g., by deleting stored video not containing any motion. Automated video surveillance often is activated as a result of motion being detected in the surveilled scene, in which case most video data stored will contain motion, making this last approach somewhat limited in its effect.

It is preferable that pruning of video data can be performed without analyzing the actual image data, i.e., without decoding the video data, since that would be a labor-intensive process in terms of computational load and thereby time and energy.

Hierarchical video coding is an encoding technique in which encoded images are arranged in layers, and it is a technique commonly used in scalable video coding. In such an application the different layers may contain video of different temporal or spatial resolution, and depending on bandwidth or client devices a transmitted video may be tailormade from the hierarchical structure. See e.g., "Overview of the Scalable Video Coding Extension of the H.264/AVC Standard" (Schwarz et al., "IEEE Transactions on circuits and systems for video technology, Vol. 17, No. 9, September 2007).

The present disclosure aims at providing an improved method for generating prunable video data.

SUMMARY

To accomplish the desired aim, the present disclosure provides, in a first aspect thereof, a method of encoding a video stream for the provision of prunable video data. The method comprises receiving, in an encoder, a video stream in which each image frame of the video stream is divided into a number of predetermined subviews. Furthermore, each subview is provided with an assigned category based on a content of the particular subview, and the assigned category is monitored for each subview such that, in the encoder, the video stream may be encoded using a hierarchical P-frame encoding structure, in such manner that each change in category for a subview starts a new hierarchical P-frame structure.

The method enables the generation of a video stream having a unique structure. The structure is particularly well-suited for the facilitation of an efficient pruning process at a later stage. Once the base of the structure is set, the method provides a versatile and dynamic solution to the problem of efficient pruning, and it enables excellent control in that the effects of a particular pruning is fully predictable. Furthermore, the method enables a solution where different parts of an imaged scene may be treated in different ways during pruning, but still a full view of the imaged scene will be maintained, even after the pruning process.

In one or more embodiments the content of the particular subview, which determines the assigned category, comprises object classes. The use of object classes is well-known in image processing and by that it offers a reliable alternative when assigning a category, e.g., since there are several available algorithms for determining a class for an object detected in the view. Furthermore, the presence of a particular object class is a suitable discriminator for a pruning process, where examples could include that subviews containing object class "human" (thus assigned with a particular category) are kept while subviews containing object class "animal" or lacking object class are pruned. This relates back to the advantage of predictability and transparency mentioned earlier. Furthermore, the use of object classes also harmonizes well with a video-monitoring situation, which is one expected field of technology where the present teachings may be implemented.

Instead of, or in addition to, using object classes the content referred to may relate to motion. An example is that detected motion, or motion above a certain threshold, may be a factor when assigning a category to a particular subview. Again, motion detection algorithms are a well-used in image processing (video processing in particular) and it is furthermore a parameter which is relevant in most video-monitoring situations.

In one or several embodiments, the content as such is determined from image metadata relating to the particular subview. It is a fact that in most video processing systems the outcome of algorithms already active and processing images is written as metadata for each image. Using the existing metadata results in a processing efficient method, where no additional algorithms will need to be applied.

The method may be used to process existing video data, yet in a preferred embodiment the method also comprises acquiring video data for generation of the video stream. Many of the advantages, according to several of its embodiments, are enhanced if the method is performed already in connection with the collection of video data, since the generated video stream will be prepared for pruning without any additional processing.

In one or more embodiments it also comprises transmitting the encoded video stream, in most cases transmitting it from the video camera having acquired it in the first place.

There are at least two different categories assigned to different subviews, which categories could correspond to a category of higher importance (higher level of priority) and a category of lesser importance (lower level of priority) in a pruning situation.

In one or more embodiments there is a need of ensuring the authenticity of the video stream and in such embodiments the method may further comprise generating a first hash value based on the whole video stream, and generating a second hash value based on all or a selection of separate subviews, and signing both the first and the second hash, in order to allow verifying the authenticity of the video both when not pruned and when pruned. This embodiment, which is more of a family of embodiments, will be further described and defined in the detailed description, yet hashing and signing any subview in isolation will result in a versatile set of data, which may be good in some applications, while NOT wasting resources on hashing and signing subviews that will be pruned at a later stage is a good strategy in some applications. Hashing and signing in this context may be applied to individual images of the video, or on a higher level, such as entire groups of pictures (GOPs), or on a higher level still, driven by an effort to reduce the computational need. Note that according to the features as described above, before pruning the entire video as such will have a signature and may thus be authenticated and following the pruning the remaining video will have a signature as well.

In one or more embodiments, and as indicated above, the method may be performed in a video camera, resulting in the advantages already mentioned.

The method as described above is intimately connected to a family of embodiments also comprising pruning the video data. When pruning the video data use is made of the categories assigned to each subview, and in particular it may comprise discarding some or all hierarchical sequences of subviews being assigned a category of lesser importance (lower priority). Note, as will be emphasized again, what is considered to be "lesser importance" may be known as the categories are assigned to subviews, yet it may also be set as a parameter when performing the pruning. In any case, there are practical benefits in using the assigned categories and the hierarchical structure during pruning, e.g., the predictability already mentioned, but also the effect that a minimal amount of processing will need to be performed on the video data, provided that the level of importance is indicated in the appropriate place.

Returning to the issue of pruning this will also flare out to a number of embodiments, each having its advantageous effects, and each being suited for a particular situation. A common approach in relation to pruning is to perform pruning either at regular intervals or after a certain specific time of storage (e.g., 24 h, one week, one month, etc.), in which case the video data is most likely already in a storage, or even a long-term storage, e.g., at a server on in a cloud.

Consequently, in one embodiment the video data is pruned after it has been transferred to such storage. In this way a space available in the present storage will increase, and in applications where the storage volume is associated with a cost, the cost will be reduced.

Another approach is to prune the video data already before it has been transferred to such storage, which would be comparable to performing a screening of the video data with the purpose of reducing the size while still maintaining video information believed to be important. A situation could be that the video data has been temporally stored in a storage of the video camera or in a local storage and as it is transferred to a centralized storage (server, cloud) the pruning is performed.

In still another embodiment the video data may be pruned before even leaving the video camera. This may be an appropriate approach in at least three situations. The first is that the storage space available in the video camera is limited and that the amount of video data closes in on or is projected to increase above that limit. The second situation could be that the bandwidth for transfer of video data is limited, temporarily or statically, and by performing a pruning already in the camera the transmitted stream will require less bandwidth for successful transmission, resulting in that important video information may still be transmitted. The third situation is that the cost of data transfer is based on file size and that the cost is substantial, in which case a reduction of data prior to transfer would be beneficial.

In cases where the subview division was mentioned last, the subview division may be predetermined or dynamically set. Predetermined implies that an operator knows how the view will be divided, such as four equally sized views, six equally sized view, etc. or one set of views for important areas of the image scene and one set for the less important areas of the scene, etc. This is the least complicated approach.

In a more elaborate embodiment, the division is dynamically set, and in such a case the division may take into account events in the scene. As an example, one or more areas around and including one or more objects of interest defines one or more subviews, while other areas define other subviews. In this embodiment there is a higher processing complexity, yet there is also believed to be a greater effect on video data reduction in a pruning process. Just to give an example clarifying the latter statement: Consider a situation with four predetermined subviews. If a single object of interest is located in an area where these subviews meet, each subview will contain the object, and each subview will be assigned a category resulting in that it will be unaffected during a pruning process (thus no savings in storage space). In embodiments where the division is dynamic, the single object of interest will define a single subview, and the rest of the view will be assigned a lesser importance. In a later pruning process, only the subview containing the object will be spared from pruning (thus maximizing savings in storage space, will maintained relevance).

A further scope of applicability of the present teachings will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description. Hence, it is to be understood that is the claims are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

Figure 1:
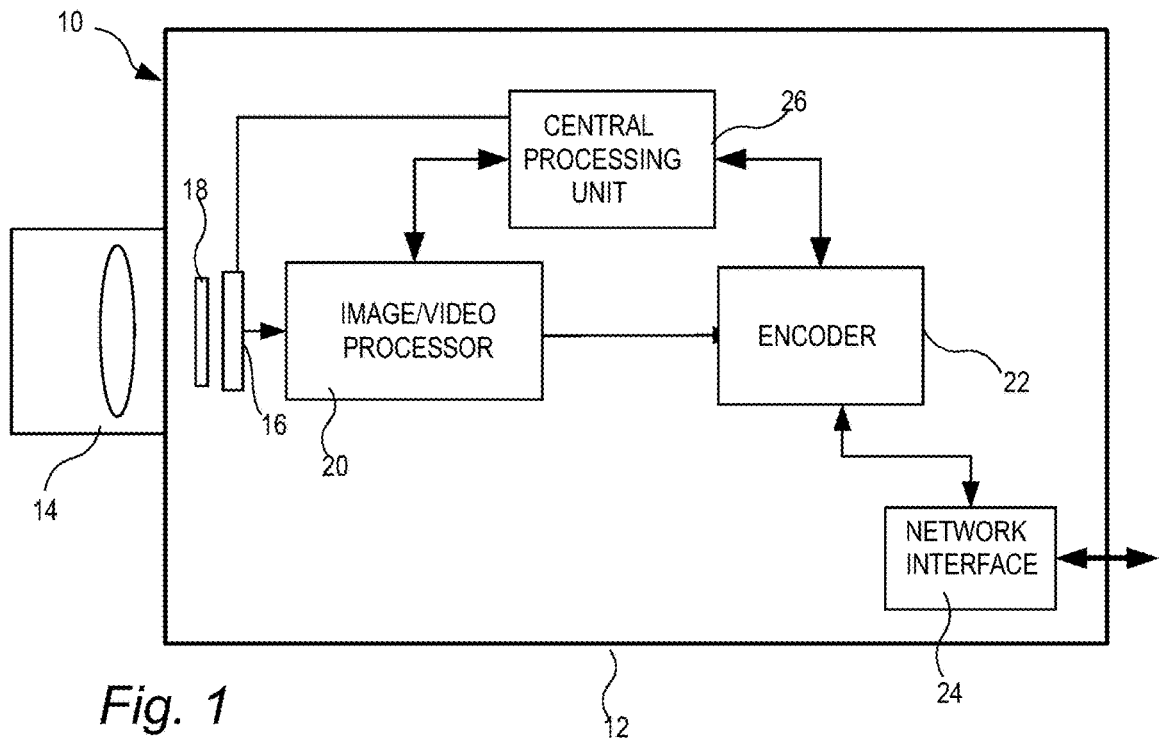
FIG. 1 is a schematic of a video camera that may be used when performing one or more embodiments thereof.

FIG. 1 illustrates a video camera which can be used when performing a method according to one or more embodiments. It should be noted that the video camera description to follow is rudimentary, since present teachings do not reside in the area of camera design, and furthermore there are numerous different ways of describing the interior components and functionalities. The video camera 10 has a housing 12 and some imaging optics 14. The imaging optics 14 focuses an image of a scene on an image sensor 16. An IR-cut filter 18 may be arranged in front of the image sensor 16 to prevent IR radiation from reaching the image sensor during day-mode imaging, which would otherwise distort color imaging. The filter 18 may be arranged on an actuator, not shown, enabling for it to be inserted and retracted from its position in front of the image sensor, thus making it possible for the camera to switch to night-mode operation where also IR-radiation is allowed to reach the image sensor to enhance the total amount of incoming radiation. The image collected is forwarded to an image processing pipeline (IPP) 20, and if not done in an image sensor module, the image processing pipeline will generate an "true" image from the raw sensor data, including noise reduction, demosaicing, white balance, image transformation, etc. Following the IPP 20 the image stream is forwarded to an encoder 22, in which the image data is encoded according to a predetermined standard, such as H.264 (AVC), H.265 (HEVC), H.266 (VVC), EVC, VP9, AV1 etc. Following the encoder 22 the encoded video stream may be transmitted from the video camera via a network interface 24, if available.

A central processing unit 26 controls the components and functionality. There are internal memories, volatile and non-volatile for ensuring the operation, but these are not shown in FIG. 1. It has been stressed that the illustration of FIG. 1 is a schematic simplification, which should be readily understood. It should also be understood that the video camera does not have to include every component within the same housing. As an alternative example an imaging unit, at least comprising the imaging optics, may be separate from a processing unit, at least comprising the encoder. The two units may be interconnected via a wire (which may be preferred for performance) or via a wireless connection. Such solutions are commonly used where it is desired to provide a small imaging unit that could be arranged in a small or concealed location.

Assigning a category, which could also be denoted a priority, a rank or a level of importance, to a subview is conveniently based on metadata for that particular subview. The metadata may emanate from the encoder, or from an image processing algorithm prior to the encoder. The category may be based on anything that is detectable/recognized/distinguishable in the imaged scene, and the level of detail may vary with the particular application. We will return to this in the description related to FIG. 3.

Existing standard decoders do not include support for subview categorization, however and importantly, the addition of a subview category does not hamper the functionalities of existing standard decoders, they will simply not notice it. This is important since it means that the resulting video stream may be utilized irrespective of the decoder used, while tailormade systems may still take advantage of the present teachings.

Figure 2:
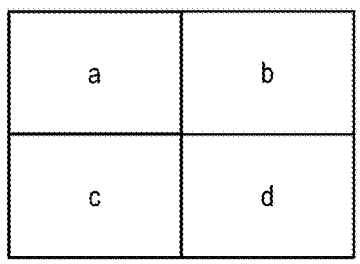
FIG. 2 is a simplified schematic of an image frame divided into four subviews, a, b, c, and d.

FIG. 2 shows an example of a division of a single image frame into subviews. The feature called "subview" in this specification may have other names depending on the encoding standard used, however "subview" is a descriptive term that is easy to understand. In H. 264 it could correspond to slices, in H. 265 to slices/tiles, in H. 266 tiles, in AV1 tiles, etc., i.e., a subdivision of a full image frame which is supported by the encoding standard used. As will be discussed the division may be predetermined and fixed to fit a particular use case and provide efficient and predictable results, while in other examples it could be dynamic to provide maximum versatility and potential savings in storage space.

In this example, as well as in the subsequent description, the full image is divided into four subviews (slices/tiles) in order to make the description straightforward and easy to follow. In a practical situation there could be a higher, or lower, number of subviews, and they would not have to be of an equal size. These latter parameters (the number subviews and the shape of each subview) are limited by the limits of the particular standard used, and the restrictions will not be discussed here. Theoretically, other designs could be applied as well, but in a practical situation following the limitations set by the standard is not believed to cause any problems. The next paragraph will describe aspects of the category assignment, yet in relation to FIG. 2 it should be highlighted that the division into subviews could also be used to facilitate the subsequent processes. As an example, the imaged scene may be divided into subviews mirroring expectations of the importance of various areas in the scene, e.g., one subview could contain the sky (where not much is expected to happen), one could contain buildings or areas of lesser importance, while a particular entrance or path/road could be attributed to another subview. Also, areas deemed to be important could be divided into subviews having a greater spatial granularity (i.e., each subview covering a smaller part of the frame) if considered appropriate.

Figure 3:
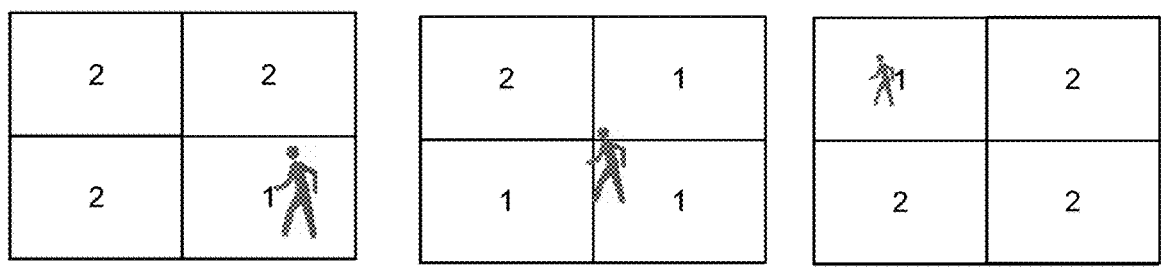
FIG. 3 is sequential view of three points in time showing how the priority of different subviews may vary with events in an imaged scene, illustrated over three sequences I, II and III.

FIG. 3 is a sequential view illustrating three moments in time as an object, in this example a person, crosses the imaged scene. During each sequence the different subviews are attributed a category, where the example is the numeral 1 indicating a category of higher importance, and the numeral 2 indicates a category of lower importance. One could foresee situations where there would be a benefit from having more levels. To briefly expand on the categories, they could relate to a particular object class, such as "people", "vehicles", "animals", and they could also relate to attributes within that particular class, such as "faces", "cars", "dogs", but they could also involve action of a particular object, such as "person running", "car driving fast", as well as relational situations, such as "person approaching gate" etc. In short, anything that could be identified could be used in a categorization scheme, and what is actually used will depend on the particular installation and preferences of the operator. Further down the line, the categorization may be used in an implementation of a pruning strategy, as will be discussed.

The different sequences are initiated by a change in category for one or more of the subviews, in FIG. 3 this is exemplified by the person passing into, or out of, a subview, i.e., a detectable change concerning an event of interest. As will be described in some more detail referring to FIGS. 4-6; If there is no change in a particular subview the encoding of that particular area will continue in the same hierarchical structure, while if there is a significant change a new hierarchical structure will be generated.

In the present example the object is a walking person. It could equally well be any other distinguishable (detectable or recognizable) object, moving or stationary, depending on the particular monitoring situation.

Figure 4:
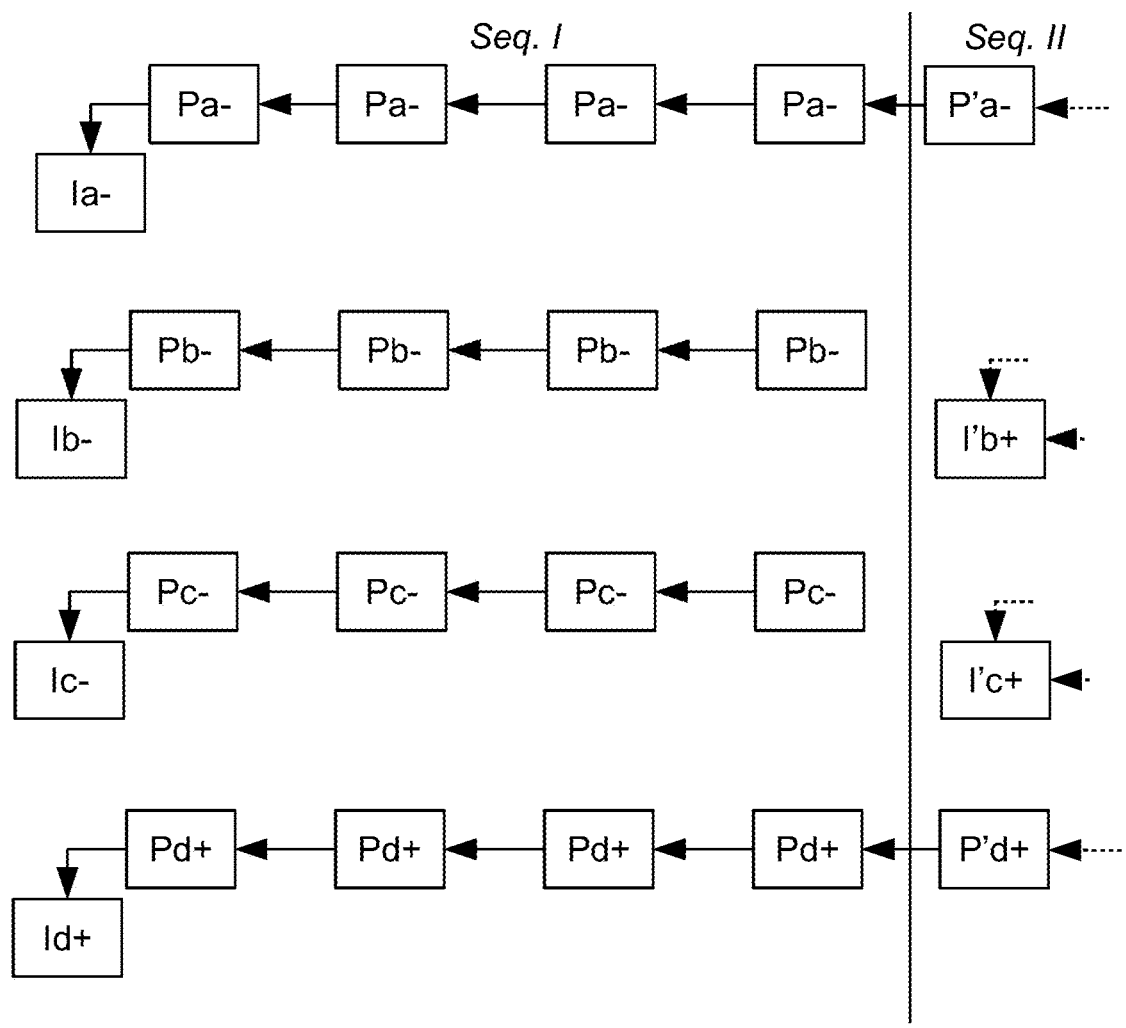
FIGS. 4-6, in turn, exemplifies how the different subviews a-d may be encoded and prioritized during the sequences I, II, and III, according to an embodiment.

FIG. 4 illustrates encoding of the different subviews a-d of the first sequence (and the start of the second). Each subview is given a separate row, but this is for better illustrating the present method and the independence of each subview, in the actual encoding the different subviews are assembled into a single full view. Also, in the example, in FIG. 4 each subview is initiated by an I-frame, such as if encoding just began. This is also just an example.

Looking at the structure for subview "a" it is initiated with an I-frame, and since there is no object of interest in the subview it is assigned a category with lower importance, indicated by the minus sign. Hierarchical encoding is initiated and the P-frames to follow also have the same category assigned to them.

The same procedure is effected for the other subviews as well, although notably subview "d" has been assigned a category of higher importance (as indicated by the plus sign), since it contains the object of interest.

The vertical dashed line that extends over each subview-encoding structure in FIG. 4 indicates a transition between sequence I and sequence II. The transition is initiated since there has been a change in the content of at least one subview. In the present example represented by the object of interest entering subviews "b" and "c", respectively, while still being present in subview "d".

For subviews "a" and "d", respectively, the transition is of no consequence. Both these subviews have the same category as before and encoding can continue in the same hierarchical structure. For the other subviews, however, a new structure is initiated, and the contents of this structure is assigned the higher category. In the example, each new structure starts with an I-frame, yet it could equally well be a P-frame referring back to a previous I-frame or P-frame on the same hierarchical level.

At this time, it is appropriate to note that a new hierarchical structure could be initiated even if nothing in particular occurs in the image. After a certain number of frames or following that it is inefficient to add further P-frames, an I-frame will be generated. At this stage a new hierarchical structure is generated since the I-frame in generated in on a base level, although no change in category for the structure is generated. Also, note that the categories themselves are neutral, and the reference to "higher" and "lower" refers to their later impact in a pruning sequence for this particular embodiment.

Figure 5:
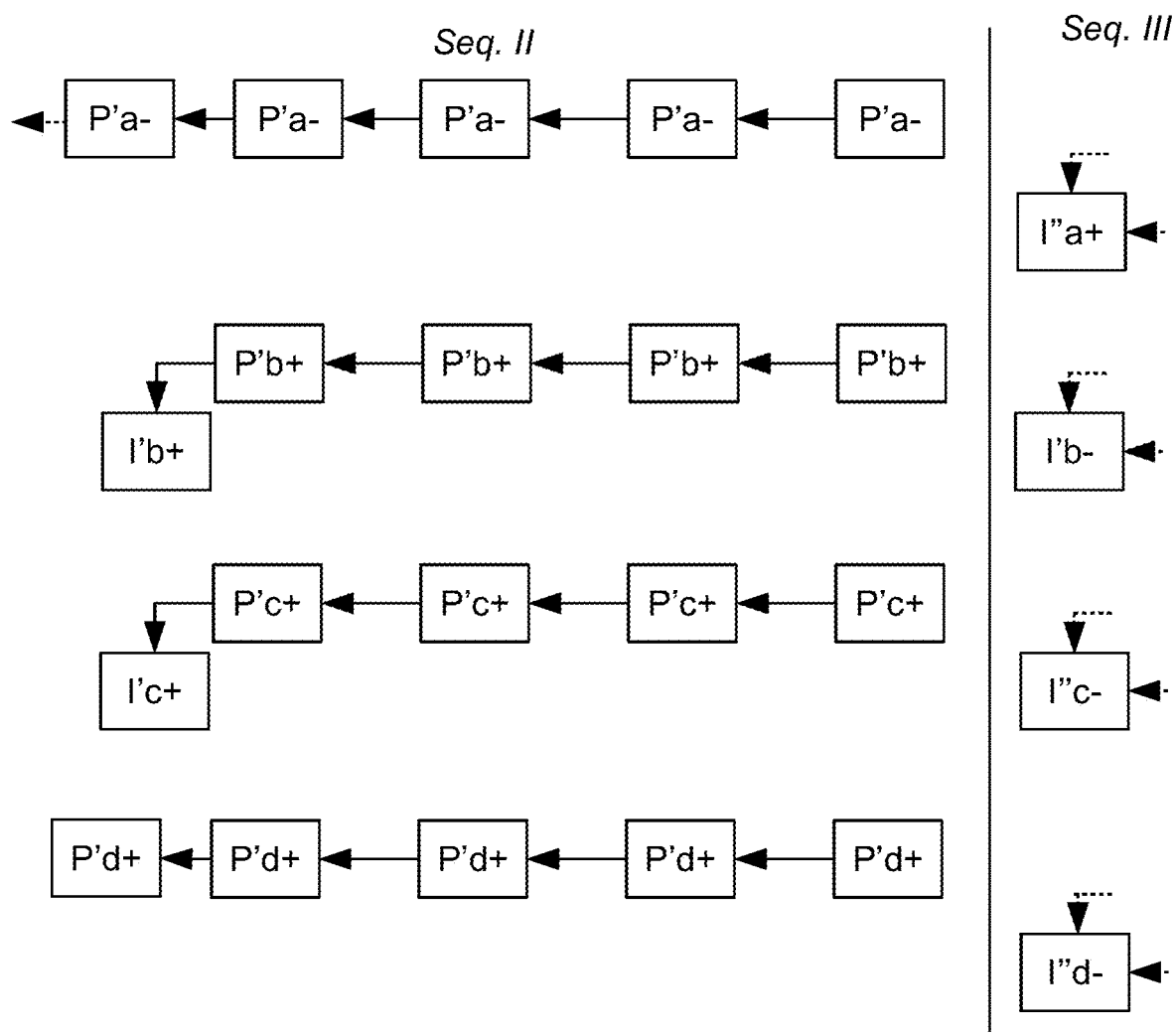

FIG. 5 illustrates sequence II for each subview, and following the description of FIG. 4, FIG. 5 should be readily understood. Similar to before, the transition to the next sequence is indicated by the vertical dashed line, and again the transition itself is initiated by a change in the content of at least one subview. This time the object enters subview "a", and leaves subviews "b", "c" and "d". This means that for these subviews a new hierarchical structure is initiated, and the category of subview "a" is changed to the higher level, while for the other subviews the category is changed to the lower level. Again, as for sequence II, sequence III of this example is initiated by an I-frame (one for each subview) while it could equally well have been initiated by a P-frame.

Figure 6:
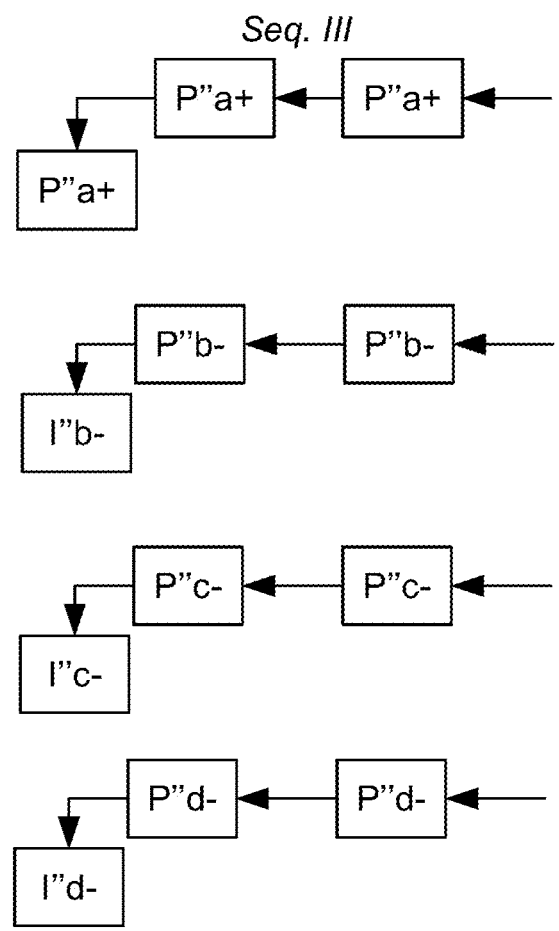

FIG. 6 then illustrates the same structure, yet for sequence III, and further explanation of the drawing is considered superfluous.

The present scheme provides a significant advantage in regard of signed video. Due to the structured hierarchical approach the effects of a pruning session will be fully predictable, i.e., pruning is performed according to the predetermined scheme. This means that it will be possible, without any additional effort, to sign the two or more versions of the video so that there will be signed video provided in every step of the lifetime of the video data. Basically, the full video may be given one signature, e.g., via a hash function or other signing means, and the high-importance subview video may be given another signature. The two signatures may take advantage of each other, yet it is important that they can be used for verification/authentication in isolation. Notably, it will be sufficient with two different hash functions in the preferred embodiment. There is no need to separately hash and sign a subview having a category assigned to it resulting in it being pruned first. The reason is that it is included in the full video, and hashed and signed with it, and as soon as pruning is performed it will be removed.

In a situation where the pruning preferences are unknown or uncertain—the preferences may be set at a later stage—every subview may be hashed and signed separately. Furthermore, in a generalized embodiment the number of signatures could correspond to the number of categories. Subviews having the same category during the same time could be combined prior to being hashed and signed. In any embodiment hashing of several branches may be effected by sequential hashing of individual branches, and embodiments should not be construed as limiting to the various options available when it comes to hashing and signing video data. There is great flexibility when it comes to this stage of the process, and the parameter that may be said to govern the process is the step that has the highest computational cost, at the time of writing being the signing of the data. Presently, signing data is an expensive process in terms of computing power. Imagine a typical situation with a frame rate of 60 frames per seconds, and 4 subviews, where each subview of each frame were to be signed. This is possible, but the computational load would be significant. That is where the initial hashing of the data becomes an important feature. The enormous amount of data may be reduced significantly, by several orders of magnitude, while still maintaining a 1-to-1 relationship with the original data in terms of authenticity, and the computational load associated with adding the signature will be reduced.

The appropriate scheme relating to how combination of subviews or categories should be hashed will be affected by the expected use of the video data. If each subview is hashed and signed separately, it would theoretically be possible to inject a replacement subview (e.g., a subview from a previous day) and everything would appear fine. Adding a signature to the full image would make such a tamper effort detectable, yet once the pruning has been performed the signature of the full image would no longer be valid. This problem could be circumvented by hashing and signing subviews of the same category in combination or in sequence, where a current hash is dependent on a previous one, only, or in combination with signing them separately and/or signing the full image. Preparing for any eventuality results in numerous computations, and a way of reducing the computational load would be to sign on the level of group of images (GOPs) rather than on individual images, or on even more general levels still. The strategy used is not essential as such and, as mentioned, the most appropriate one will most likely depend on knowledge of how the image data will be handled downstream.

For convenience it may be suitable to add information concerning the assigned category to the signature, such that it is readily accessed at a time of pruning. Typically, a hash would be generated prior to the stream leaving a kernel space of the camera, for maximum security, and preferably immediately following the encoder.

Figure 7:
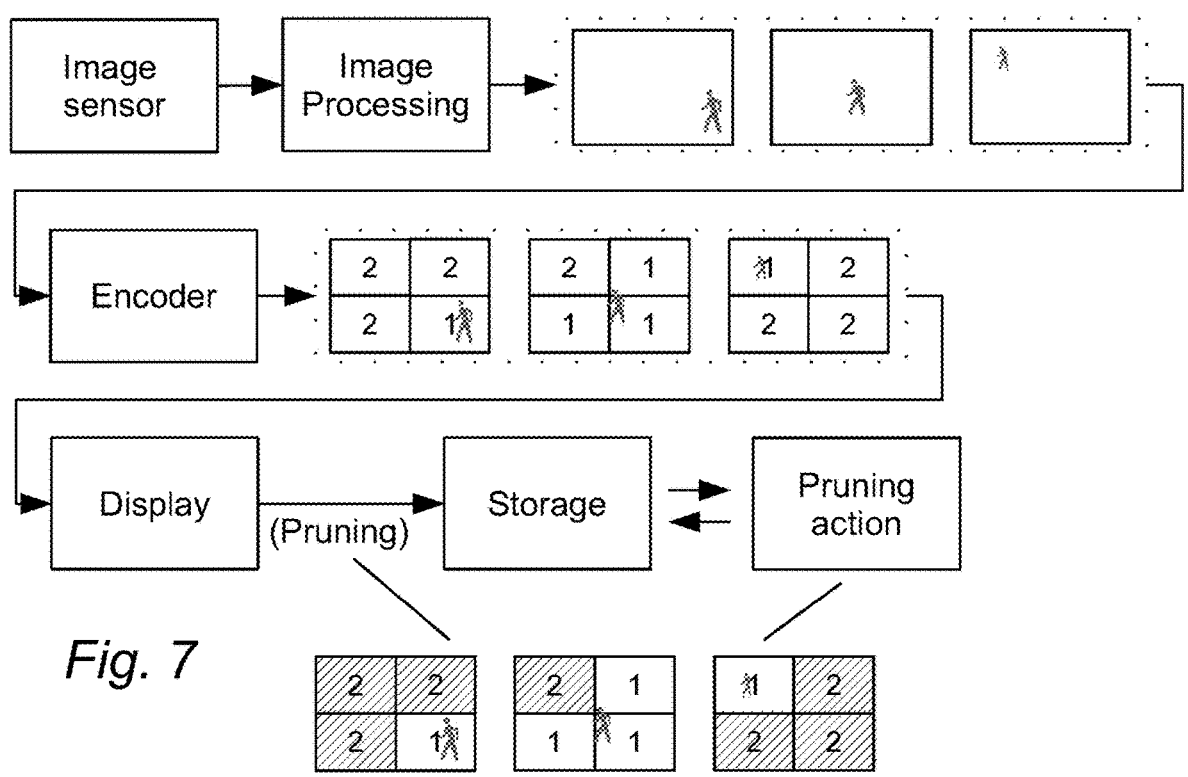
FIG. 7 is a schematic of a flow from image acquisition to potential pruning, according to some embodiments.

The thus formed stream may be sent for display (live view) as indicated in FIG. 7. Also, it may be stored in a local storage in the camera and/or to other remote storage (centralized storage, server, a cloud solution, etc.). Any or all of these operations may occur, e.g., the stream may be stored locally as well as centrally, using the same or different rules for the particular storage.

The video data may be pruned at, before, or after any of these operations. It is likely that an operator monitoring the live view would like to have the non-pruned scene, but it may otherwise be pruned prior to leaving the video camera. Such an approach may be advantageous in situations where the bandwidth is temporarily or permanently low, or when video data is stored on a limited memory of the. Another alternative could be to prune the video data before transferring it to the storage (local and/or remote) in order to provide for space-efficient storage. A third option could be to prune the video data according to a pruning scheme. The pruning scheme may be based on time in storage, e.g., after two weeks a pruning operation is performed, regardless of a present storage capacity. Also, or instead, the pruning operation could be based on need; if there is limited storage capacity available the pruning operation could be triggered to improve the situation.

The pruning is illustrated in FIG. 7 as well, and it basically consist in deleting all encoded subviews being assigned the category of lower relevance, which is readily done by removing the hierarchical structures of P-frames with that assignment. In a situation with two different categories the video data is pruned in the most obvious manner. Should there be a higher number of categories, which could be construed as "important", "non-important", and "possibly important" in a pruning process the pruning process could follow a more elaborate scheme, and since any category may be identified in the pruning process, any category could be removed in said process. It should be noted that for the purposes of the present teachings pruning could also imply that the quality of the frames or sequences being assigned the less important category is reduced, such that the file size may be reduced, without deleting the frame completely. Presently, this approach is not possible unless the video data is transcoded, which is a procedure that in some installations is preferably avoided because of the increased processing required. There is also an issue of previous hashes and signatures that may be rendered useless. Even so, the present teachings would facilitate the solution, whether it is preferred or not. From an authentication standpoint it is possible to transcode and then sign the transcoded video, in which case it would be possible to note the transcoded subviews as less reliable (or at least keep track of where, when and/or by whom they were transcoded and pruned) while still maintaining a chain of trust.

From a practical standpoint the pruning is performed as a multistep process. The first step is to access the categorizations, which in the examples given may consist in unpacking a video file so as to access SEI-headers (or corresponding headers in other standards), which is an example of where the category assignments may be stored. For the present technical field and coding standard the use of headers is beneficial, but there is nothing saying that in another application or other standard/format the necessary information could be stored in a separate file or in another location of the image, file, or data structure. The exact location is not crucial as such, yet the example has the advantage of not requiring for the video to be decoded in order to be pruned. In a comparison, decoding would be tenfold more resource demanding than a mere unpacking procedure. In the next step the assigned categories are compared with any pruning criteria, and unwanted sequences are discarded. The hierarchical structure enables for clean removal of sequences. Following the pruning the video file may be packed again and left for further storage. The category assignments could also be stored in a metadata file, enabling correlation between category and video sequences.

The invention claimed is:

1. A method of encoding a video stream for the provision of a prunable video stream, comprising:
   receiving, in an encoder, a video stream in which each image frame of the video stream is divided into a number of subviews,
   assigning a category to each subview in each image frame of the video stream based on a content of the particular subview,
   monitoring the assigned category for each subview in each image frame of the video stream and identifying any change in the assigned category for the particular subview in relation to a previous image frame,
   encoding the video stream to create an encoded video stream using hierarchical multi-layer encoding, in such manner that, for each subview in each image frame of the video stream, each change in the assigned category for the particular subview in relation to the previous image frame starts a new hierarchical P-frame structure for the particular subview.

2. The method of claim 1, wherein the content, based on which category is assigned to each subview in each image frame of the video stream, comprises object classes.

3. The method of claim 1, wherein the content, based on which category is assigned to each subview in each image frame of the video stream, comprises motion.

4. The method of claim 1, further comprising determining the content from metadata relating to the particular subview.

5. The method of claim 1, further comprising acquiring video data for generation of the video stream.

6. The method of claim 1, further comprising transmitting the encoded video stream.

7. The method of claim 1, wherein there are at least two categories to assign, comprising a category of higher importance and a category of lesser importance.

8. The method of claim 1, further comprising
   generating a first hash value based on the whole video stream, and
   generating a second hash value based on all or a selection of separate subviews, and
   signing both the first and the second hash, in order to allow verifying the authenticity of the video both when not pruned and when pruned.

9. The method of claim 1, wherein the method is performed in a video camera.

10. The method of claim 1, further comprising pruning the encoded video stream by means of discarding some or all hierarchical P-frame structures of subviews being assigned the category of lesser importance.

11. The method of claim 10, wherein the encoded video stream is pruned prior to being transferred to a storage.

12. The method of claim 10, wherein the encoded video stream is pruned post being transferred to a storage.

13. The method of claim 10, wherein the encoded video stream is pruned prior to leaving a video camera.

14. The method of claim 1, wherein the subview division is predetermined.

15. The method of claim 1, wherein the subview division is dynamically set based on events in the imaged scene.

* * * * *